March 2, 1926.  
A. S. BARKER  
1,574,751  
COMBINED GRAIN CROSS CONVEYER AND DOCKAGE REMOVER  
Filed Dec. 31, 1924  2 Sheets-Sheet 1
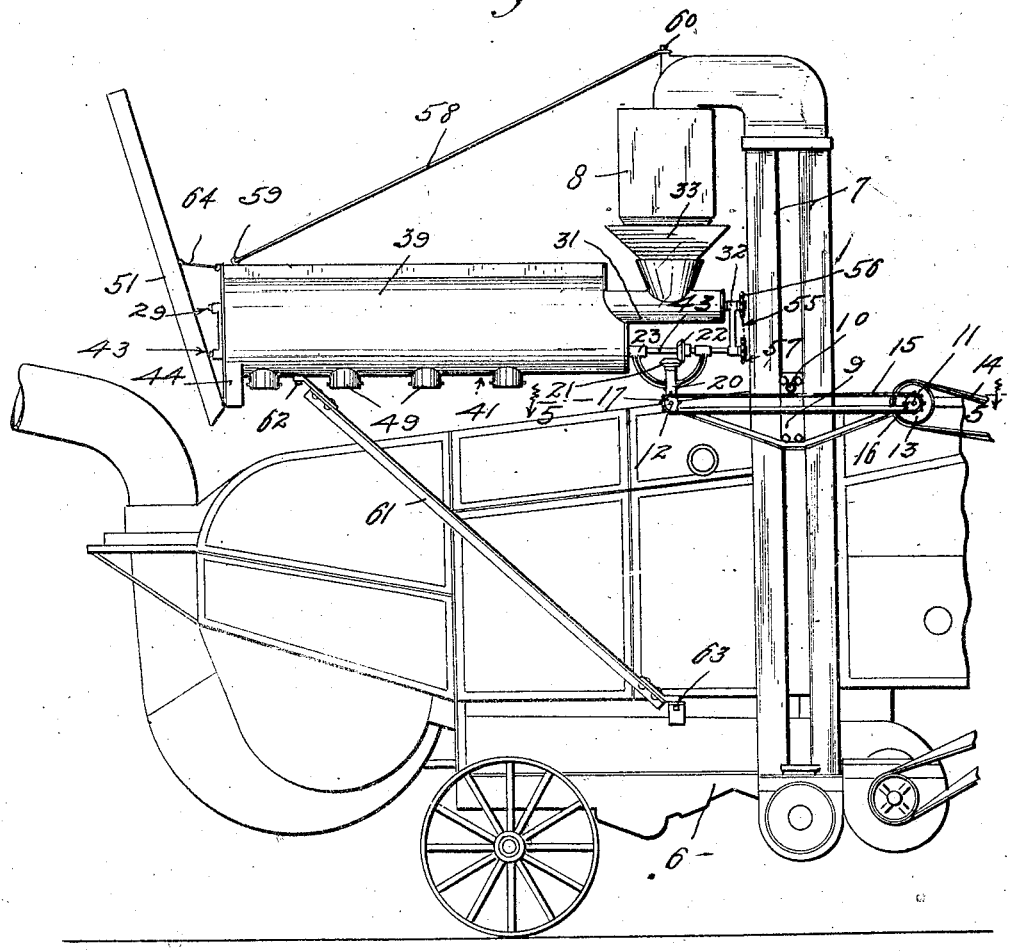
Fig.1
Fig.5
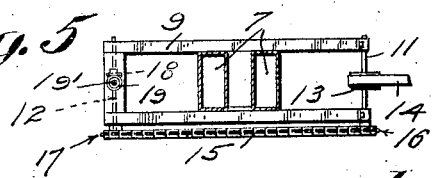
Inventor  
Anson S. Barker  
By his Attorneys

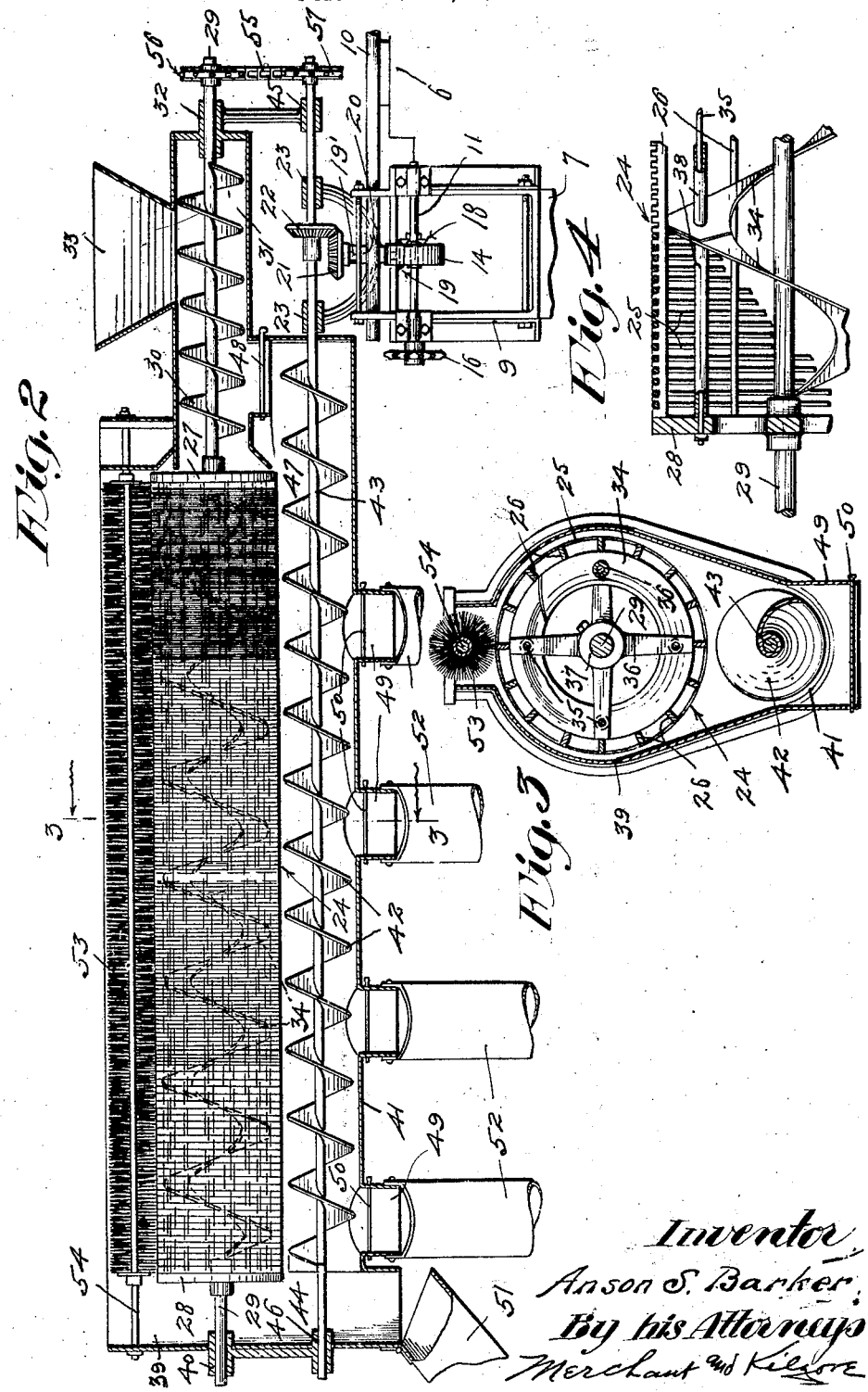

Patented Mar. 2, 1926.

1,574,751

UNITED STATES PATENT OFFICE.

ANSON S. BARKER, OF MINNEAPOLIS, MINNESOTA.

COMBINED GRAIN CROSS CONVEYER AND DOCKAGE REMOVER.

Application filed December 31, 1924. Serial No. 759,044.

*To all whom it may concern:*

Be it known that I, ANSON S. BARKER, a citizen of the United States, residing at Minneapolis, in the county of Hennepin and State of Minnesota, have invented certain new and useful Improvements in Combined Grain Cross Conveyer and Dockage Remover; and I do hereby declare the following to be a full, clear, and exact description of the invention, such as will enable others skilled in the art to which it appertains to make and use the same.

My invention has for its object to provide a combined grain cross-conveyer, and dockage remover intended for general use in connection with a threshing machine but especially adapted to take the place of the customary cross-conveyer which may be of the type used to receive grain from the automatic weigher or elevator of a threshing machine.

To such end, generally stated, the invention consists of the novel devices and combinations of devices hereinafter described and defined in the claims.

Grain as it comes from a threshing machine always contains more or less wild oats, cockle, wild mustard, wild peas and various other foreign seeds and substances, together with cracked or broken grain, shrunken grain and the like which, collectively, are known as dockage. This grain, as it is received from a threshing machine, is almost universally shipped to elevators, mills or other places where the same is purchased; and it is an established practice to take from the cars small samples and, by the use of hand operated screens or other separating means, to separate the dockage from the good grain to thereby determine the grade or value of the grain. By this method the farmer must pay, directly or indirectly, the freight on the entire shipment, good grain and dockage, but is only paid for the good grain and at the same time loses the dockage. This dockage is sold at the mills or elevators where it is removed from the good grain for feed.

By the use of my invention, all of the dockage or any percent thereof may be removed from the good grain as it comes from a threshing machine without any additional work or cost, or if desired, all of the dockage may be left in the grain.

One of the principal advantages of removing the dockage from the good grain as the same comes from a threshing machine is that said dockage may be kept on the farm and used as feed where the same is needed.

A still further advantage is in the reduced number of cars required to handle grain from which dockage has been removed, as well as the reduced storage space required and the reduced amount of work and cost in handling such grain.

By the use of my combined cross-conveyer and dockage remover, a farmer may decide, at the time he is doing his threshing, whether or not he wishes to remove all of the dockage from the good grain, or a certain percent thereof, or leave all of the dockage in said grain. If all of the dockage is removed from the good grain, no extra expense or labor is incurred and the shipping expense is materially reduced and it is not left to the purchaser to determine the amount of dockage in the grain. Furthermore, the farmer retains the dockage for feed, which would otherwise go to the purchaser.

In the accompanying drawings, which illustrate the invention, like characters indicate like parts through the several views.

Referring to the drawings:

Fig. 1 is a fragmentary side elevation of a threshing machine equipped with an automatic weigher and having the invention embodied therein, and arranged to receive grain from said weigher and take the place of the customary cross-conveyer;

Fig. 2 is a view of the invention principally in longitudinal central section, with some parts broken away;

Fig. 3 is a view in transverse vertical section, taken on the line 3—3 of Fig. 2;

Fig. 4 is an enlarged fragmentary detail view, partly in section and partly in elevation, of the grain separator or dockage remover and its spiral conveyer at the delivery ends thereof; and Fig. 5 is a detail view partly in plan and partly in horizontal section, taken on the line 5—5 of Fig. 1.

The numeral 6 indicates as an entirety a standard threshing machine with the exception of its elevator legs 7, and automatic weigher 8, which customarily delivers to a cross-conveyer, not shown, and for which my combined cross-conveyer and dockage remover has been substituted. The same supporting and driving means for such a cross-conveyer are, in the present instance, used in supporting and driving my combined cross-conveyer and dockage remover, and said supporting means, as shown, include a bracket 9 slidably mounted between the elevator legs 7 and carried by a transverse shaft 10 mounted on top of the threshing machine 6.

By raising or lowering the shaft 10, the bracket 9 may be vertically adjusted between the elevator legs 7. Journalled in bearings on the bracket 10 are two horizontally spaced shafts 11 and 12 which extend transversely in respect to the threshing machine 6. On the shaft 11 is a pulley 13 over which runs a belt 14, driven from a movable part of the threshing machine 6, not shown.

A sprocket chain 15 runs over sprocket wheels 16 and 17 on the shafts 11 and 12, respectively, and drives said shaft 12 from the shaft 11, and which latter shaft is driven by the belt 14. Keyed to the shaft 12 is a bevel gear 18 which meshes with the bevel gear 19 on the lower end of a short vertical shaft 19' journalled on the bracket 9 and having on its upper end a bevel gear 21 which meshes with a bevel gear 22 for driving the customary cross conveyer heretofore referred to. A bearing head 20 is swivelled on the shaft 19' and has a pair of upwardly diverging arms equipped with bearings 23 in which the shaft for said customary cross-conveyer is journalled and which supports said conveyer for horizontal swinging movement. The parts thus far described may vary materially depending on the kind of threshing machine to which my invention is applied.

Referring now in detail to the invention, the numeral 24 indicates a cylindrical grain-separating screen formed from a spiral rod mounted in circumferentially spaced notched bars 26 carried by a pair of axially spaced spider-like heads 27 and 28 mounted on a long horizontal shaft 29. Formed with the shaft 29, forward of the head 27, is an upper spiral conveyer 30 which works in a cylindrical housing affording a grain trough 31. The front end of the trough 31 is closed and has a bearing 32 in which the front end portion of the shaft 29 is journalled, and the rear end of said trough is open whereby the conveyer 30 may move grain in the trough 31 into the cylindrical screen 24 through the spider-like head 27. On top of the trough 31 is a hopper 33 arranged to receive grain from the automatic weigher 8 and discharge the same into said trough to be acted upon by the spiral conveyer 30.

Within the cylindrical screen 24 and extending the full length thereof, is a spiral conveyer 34 in the form of a sectional blade, the outer edge portion of which engages or substantially engages the inner face of said screen. This conveyer 34 is secured for rotation with the screen 24 and is carried by a plurality of circumferentially spaced rods 35 which in turn are carried by the heads 27 and 28 and a plurality of radial arms 36 on hubs 37 secured to the shaft 29. These rods 35 extend through holes in the several convolutions of the conveyer 34, and which convolutions of the several sections of said conveyer are held properly spaced by tubes 38 on the rods 35 and which tubes are held against endwise movement by the two heads 27 and 28.

It is important to note that the cylindrical screen 24 has four axially spaced sections which are of progressively coarser mesh from the front section to the rear section of the screen. The size of the mesh in the sections of the screen 24 is determined by the spacing of the convolution of the rod held in the notches in the bars 26. The cylindrical screen 24 is mounted in the casing 39, the rear end of which is closed and spaced from the head 28 and provided with a bearing 40 in which the rear end portion of the shaft 29 is journalled. This casing 39 is extended below the screen 24 and shaped to form a conveyer trough 41 in which is mounted a lower spiral conveyer 42 carried by a shaft 43 which extends parallel to the shaft 29 and in the same vertical plane therewith.

The front end of the conveyer trough 41 is closed and the front end portion thereof extends considerably under the rear portion of the trough 31, or in other words, underlaps the same. The rear end of the trough 41 is open and arranged to discharge into a short depending spout 44 leading from the casing 39 rearward of the screen 24. The front end portion of the shaft 43 is journalled in the bearing 23 and a suspended bearing 45 carried by the bearing 32, and the rear end thereof is journalled in a bearing 46 formed with the bearing 40.

Leading from the bottom of the trough 31 is a short depending spout 47 arranged to discharge into the trough 41 at its receiving end and is normally closed by a sliding gate 48; and leading from the bottom of the trough 41 are four short depending spouts 49 one for each section of the screen 24 and located under the rear end portion thereof. Each spout 49 is normally closed by a sliding gate 50. Hinged to the discharge spout 44 is a long spout 51 arranged to swing longitudinally of the combined cross-conveyer and dockage remover, and to each discharge spout 49 is hinged a spout 52 arranged to swing transversely of said combined cross-conveyer and dockage remover.

To keep the screen 24 clean, there is mounted in the casing 39 over said screen, a cylindrical brush 53 carried by a shaft 54 which extends parallel to the shafts 29 and 43 and in the same vertical plane therewith. This shaft 54 is loosely mounted in the ends of the casing 39, and the brush 53 is rotated by its engagement with the rotating screen 24. The top of the casing 39 is open over the brush 53 for the escape of dust and dirt.

The trough 31, casing 39 and trough 41 are all formed together from sheet metal suitably reinforced by commercial angle bars. The shaft 43, and hence the spiral conveyer 42, are driven by the bevel gear 22 which is keyed to said shaft; and the shaft 29, and hence the screen 24 and conveyer 30, are driven by a sprocket chain 55 which runs over aligned sprocket wheels 56 and 57 keyed to the front ends of the shafts 29 and 43.

The combined cross-conveyer and dockage remover, hereinafter designated as "the device", is free for horizontal swinging movement on the shaft 19', above the top of the threshing machine 6, and its free end is held from sagging by a rod 58 one end of which is flexibly connected at 59 to the upper end of the casing 39 and the other end of which is pivotally connected at 60 to the top of the automatic weigher 8. Said free end of the device is also supported by an angle bar brace 61, one end of which is pivoted at 62 to the bottom of the trough 41 and the other end of which is detachably pivoted at 63 to the threshing machine 6 at one side thereof. It will be noted that the pivots 60 and 63 are axially aligned with the shaft 19' to permit the required swinging movement of the device. By detachably connecting the brace 61 at its pivot 63, the same may be detached to permit the device to swing over the threshing machine 6 so that the spouts 51 and 52 will discharge on the opposite side of said machine from that shown in the drawings.

The operation of the device may be briefly described as follows, and to start with, it may be assumed that the gate 47 and all of the gates 49, except the last one, are closed. Grain, as the same is threshed in the machine, is elevated in the elevator legs 7 to the automatic weigher 8 and from thence it is discharged into the hopper 33 and directed into the conveyer trough 31. Under the rotation of the spiral conveyer 30, the grain in the trough 31 is moved therethrough over the closed gate 48, through the spider-like head 27 and into the rotative cylindrical grain screen 24. The spiral conveyer blade 34, as the same rotates with the screen 24, moves the grain through said screen, and at the same time said grain is carried upward on the rising side of the screen and then precipitated onto the bottom thereof.

Very fine seed, dust and dirt will drop through the first section of the screen 24, which is of the finest mesh, and be precipitated into the conveyer trough 41. As the grain moves through the next section of the screen 24, all seeds and foreign matter that can escape therethrough are precipitated into the conveyer trough 41, and so on until all of the dockage has been removed from the grain and the good grain discharged through the spider-like head 28, into the spout 46 and then carried by the swinging spout 51 to a wagon or truck box or sacks. The dockage, as the same is precipitated into the trough 41, is moved therethrough by the spiral conveyer 42 over the first three closed gates 50 until the same reaches the last spout 49 in which the gate 50 is open. From this open spout 49, the dockage is carried by the respective swinging spout 52 to a wagon or truck box or sacks. It will thus be seen that all of the dockage is removed from the good grain.

During the rotation of the screen 24, the same imparts a rotary movement to the brush 53 which keeps the meshes of the screen 24 open by preventing grain or foreign matter from clogging the same. All light dust and dirt rising from the grain during its agitation and travel through the screen 24 escapes through the open top of the casing 39. By closing the rear gate 50 and opening the front gate 50 only the dockage removed by the first section of the screen 24 is carried off by the respective swinging spout 51 and the balance of the dockage removed by the last three sections of said screen are moved by the spiral conveyer 42 and discharged into the spout 44 where the same is put back into the good grain. It will thus be seen that by manipulating the gates 50, all of the dockage may be removed from the grain or any percent thereof.

If the dockage is not to be removed from the good grain, the gate 48 is opened and all of the gates 50 closed. By this adjustment of the device, the spiral conveyer 30 will move the grain through the trough 31 to the open spout 47 where the same is precipitated into the trough 41 and carried therethrough by the spiral conveyer 42 and discharged into the spout 41 and carried off by the swing spout 51 without having passed through the separating screen 24. In this adjustment of the device, the same acts as an ordinary cross-conveyer.

When the threshing machine 6 is being transported, the swinging spouts 52 may be detached from the gate-equipped spouts 49 and carried on the threshing machine in any suitable place, and the spout 51 may be turned up into a position, as shown in Fig. 1, and secured to the casing 39 by a hook 64; and when thus held, the combined cross-conveyer and dockage remover may be swung into a position in which the same extends longitudinally of the threshing machine.

In place of having a swinging spout 52 for each gate-equipped spout 49, a single spout could be used and shifted from one spout 49 to the other depending on which one the dockage is being discharged from.

What I claim is:

1. A combined conveyer and dockage remover comprising a screen, sectional conveying means for delivering grain to the screen and for receiving the dockage from the screen, and a gate operative, at will, to cause one section of the conveying means to by-pass the grain in the direction of the screen.

2. The structure defined in claim 1 in which said conveying means is arranged to recommingle the dockage with the grain having passed over the screen.

3. The structure defined in claim 1 in which said conveying means is arranged to recommingle the dockage with the grain having passed over the screen, and a gate operative, at will, to intercept and remove part of the dockage from the conveying means.

4. A combined conveyer and dockage remover comprising a grading screen, sectional conveying means for delivering grain to the screen and for receiving dockage from the screen, a plurality of gates operative, at will, to intercept one or more of the different grades of dockage, either collectively or separately, and remove the same from the sectional conveying means, and a conveyer spout for receiving the grain having passed over the grading screen.

5. A combined conveyer and dockage remover comprising a grading screen, sectional conveying means for delivering grain to the screen and for receiving the graded dockage from the screen and recommingle the same with the grain having passed over the screen, a plurality of gates operative, at will, to intercept and remove one or more of the different grades of the dockage, either collectively or separately, from the conveying means, and a conveyer spout in which the grain having passed over the grading screen and the dockage from the sectional conveying means are precipitated and recommingled.

6. A combined conveyer and dockage remover comprising a grading screen, sectional conveying means for delivering grain to the screen and for receiving the graded dockage from the screen and recommingle the same with the grain having passed over the screen, a plurality of gates operative, at will, to intercept and remove one or more of the different grades of the dockage, either collectively or separately, from the sectional conveying means, and a gate operative, at will, to cause one section of the conveying means to by-pass the grain in the direction of the grading screen.

7. A combined conveyer and dockage remover comprising a rotatable cylindrical grading screen, sectional conveying means for delivering grain to the screen and for receiving the dockage from the screen, and a gate operative, at will, to cause the sectional conveying means to by-pass the grain in the direction of the screen.

8. A combined conveyer and dockage remover comprising a screen arranged to receive mixed grain to be separated, a conveyer arranged to receive dockage from the screen and recommingle all of the same with the grain having passed over the screen, and a gate operative, at will, to intercept the dockage and remove all of the same from the conveyer before being recommingled with the grain having passed over the screen.

9. A combined conveyer and dockage remover comprising a grading screen arranged to receive mixed grain to be separated, a conveyer arranged to receive different grades of dockage from the screen and recommingle all of the same with the grain having passed over the screen, a plurality of gates operative, at will, to intercept one or more of the different grades of dockage, either collectively or separately, and for removing the same from the conveying means, and a conveyer spout in which the grain having passed over the grading screen and the dockage from the conveying means are precipitated and recommingled.

10. A combined conveyer and dockage remover comprising a screen and upper and lower conveyers, the former of which is arranged to deliver grain to the screen and the latter of which is arranged to receive dockage from the screen and grain from the upper conveyer, and means operative at will to cause the upper conveyer to deliver grain to the lower conveyer and thereby render the screen ineffective.

11. A combined conveyer and dockage remover comprising a screen, upper and lower conveyers, the former of which is arranged to deliver grain to the screen and the latter of which is arranged to receive dockage from the screen and grain from the upper conveyer, a discharge spout arranged to receive good grain from the screen and dockage or grain from the lower conveyer, and a gate-controlled spout arranged, when open, to intercept the movement of the dockage to the discharge spout and remove the same from the lower conveyer.

12. The structure defined in claim 10 in which the screen is in the form of a rotatable cylinder having an internal conveyer blade.

13. A combined conveyer and dockage remover comprising a rotatable cylindrical screen, upper and lower conveyers, the former of which is arranged to deliver grain to the screen and the latter of which is arranged to receive dockage from the screen and grain from the upper conveyer, a discharge spout arranged to receive good grain from the screen and dockage or grain from the lower conveyer, means operative, at will, to cause the upper conveyer to deliver to the lower conveyer and thereby render the screen ineffective, and a gate-controlled spout arranged, when open, to intercept the movement of the dockage to the discharge spout and remove the same from the lower conveyer.

14. The structure defined in claim 13 in further combination with a swinging spout leading from the discharge spout, and a swinging spout for the gate-equipped spout.

15. A combined conveyer and dockage remover comprising a rotatable cylindrical screen, upper and lower conveyers, the former of which is arranged to deliver grain to the screen and the latter of which is arranged to receive dockage from the screen and grain from the upper conveyer, a discharge spout arranged to receive good grain from the screen and dockage or grain from the lower conveyer, said screen comprising sections, the meshes of which are progressively coarser from the receiving end of the screen to the delivery end thereof, and a gate-controlled spout for each section of the screen and arranged, when open, to intercept the movement of the dockage from the respective section of the screen and remove the same from the lower conveyer.

16. A combined conveyer and dockage remover comprising a casing having an upper conveyer trough and a lower conveyer trough, a rotatable cylindrical screen in the casing and having on its shafts a spiral conveyer working in the upper trough, said lower trough being arranged to receive dockage from the screen, a spiral conveyer working in the lower trough, a gate-controlled opening leading from the upper trough to the lower trough and arranged, when open, to intercept the movement of grain in the upper trough and deliver the same to the lower trough, a discharge spout arranged to receive good grain from the screen and dockage or grain from the lower trough, said screen comprising sections, the meshes of which are progressively coarser from the receiving end of the screen to the delivery end thereof, and a gate-controlled spout for each section of the screen and arranged, when open, to intercept the movement of dockage from the respective section of the screen and remove the same from the lower conveyer.

17. The structure defined in claim 16 in which the casing has an open top for the escape of dust and dirt.

In testimony whereof I affix my signature.

ANSON S. BARKER.